J. PORTEOUS.
VINEYARD DISK PLOW OR CULTIVATOR.
APPLICATION FILED MAY 8, 1917.

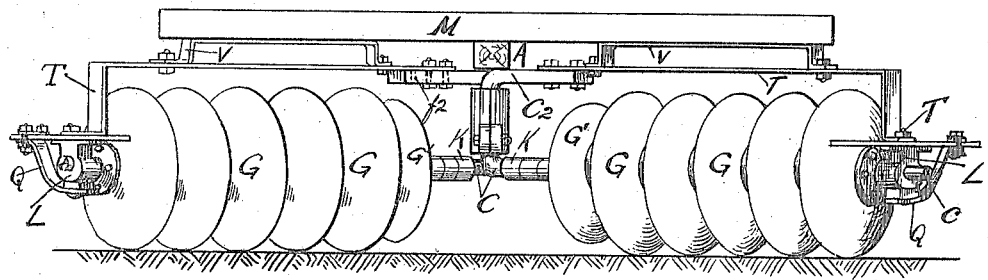
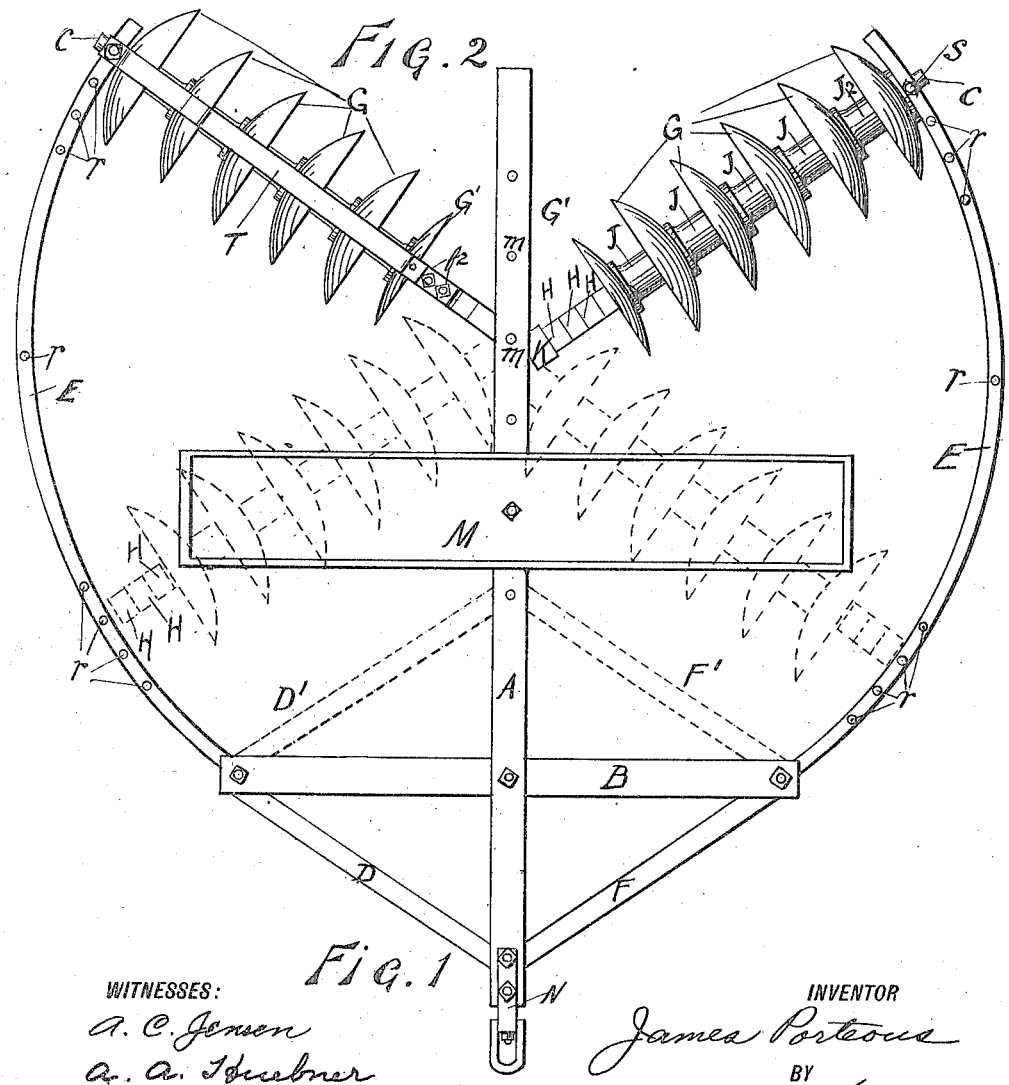

1,248,706.

Patented Dec. 4, 1917.
2 SHEETS—SHEET 2.

WITNESSES:
Andrew P. Dron.
Anita C. Jensen.

INVENTOR
James Porteous
BY
Francis C. Huebner
ATTORNEY

UNITED STATES PATENT OFFICE.

JAMES PORTEOUS, OF FRESNO, CALIFORNIA.

VINEYARD DISK PLOW OR CULTIVATOR.

1,248,706. Specification of Letters Patent. Patented Dec. 4, 1917.

Application filed May 8, 1917. Serial No. 167,340.

*To all whom it may concern:*

Be it known that I, JAMES PORTEOUS, a citizen of the United States, and a resident of the city of Fresno, in the county of Fresno and State of California, have invented a new and useful Improvement in Vineyard Disk Plows or Cultivators, of which the following is a specification.

My invention relates to a disk plow or cultivator for vineyard work in which it is desired to stir all the ground between two rows of vines by passing between the rows but one time, and more especially to that heavy type or class of disk plows which are to be drawn by a tractor, my said invention being an improvement on the form of disk harrows on which Patent No. 670070 was granted to G. T. Willis and me on March 19, 1901. The objects accomplished by the said improvements are to permit a larger range of adjustment in the width of the cut of the cultivator, to have it adjustable to throw the ground either to or from the vines, to strengthen the axle of the cultivator by having the draft applied at the middle and at each end thereof, to prevent the disks from cutting too deep, to have a weight box which can be adjusted to distribute weight evenly over the disks, for the purpose of forcing the disks into the ground, and other objects which will hereinafter appear.

Figure 3:
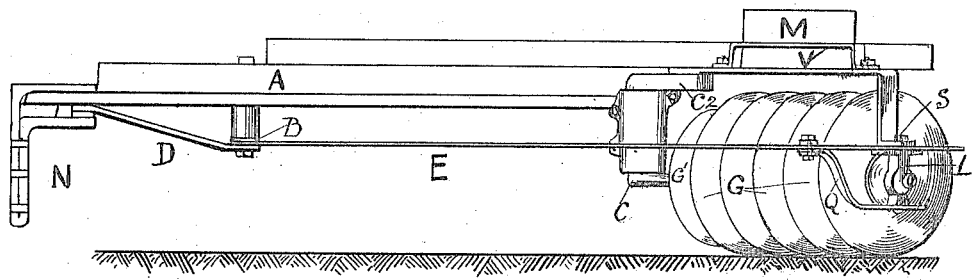
Figure 4:
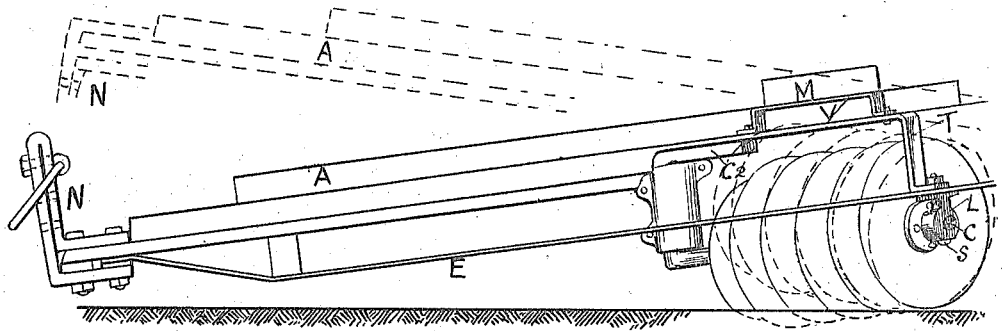
Figure 6:
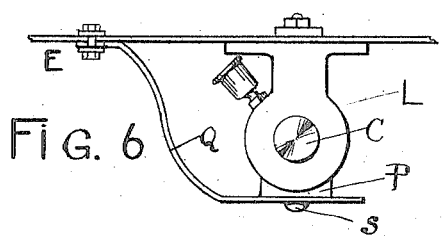
Figure 5:
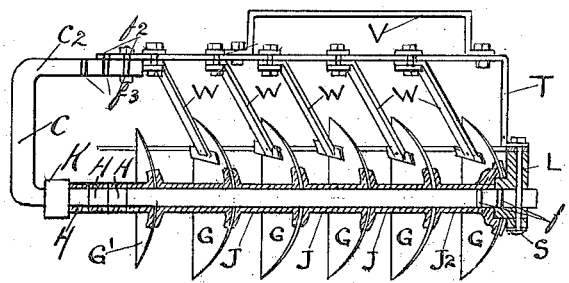
Figure 7:
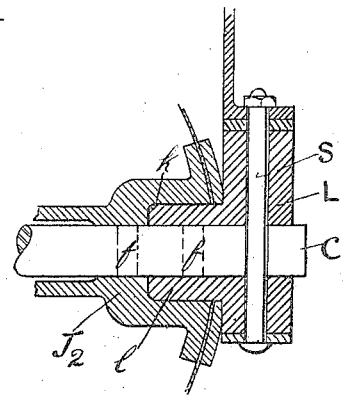

I accomplish these and other objects by means of the improvements hereinafter described and shown on the accompanying drawing, in which Figure 1 shows a top view of the plow. Fig. 2 is an end view of Fig. 1. Fig. 3 is a side view of Fig. 1. Fig. 4 is a modified view of Fig. 3. Fig. 5 is a sectional view of the axle housings and disks, showing the brace supports and disk cleaners. Fig. 6 is a side view of the boxing and shows a shoe thereon. Fig. 7 is a sectional view of a dirt proof bearing used on the axle of the plow.

In said drawing A is the main pole to which the draft is applied. B is a cross-bar near the forward end of the main pole. D and F are braces extending from near the ends of the cross-bar B to the main pole. These braces can be extended toward the front of the pole as shown in the drawing, or backward as indicated by the dotted lines $D^1$ and $F^1$. It will be noted that when the braces D and F are substituted by the braces $D^1$ and $F^1$, the pole A can be shortened and the motive power placed nearer the load to be moved. The object of shortening the pole is to get the load to be pulled nearer to the motive power, which is sometimes desirable, especially to more easily turn the plow at the ends of the rows. C is a non-rotatable axle in two sections, each section being hinged at one end to the under side of the main pole A so it can swing on a horizontal plane. L is a block support one of which is attached to the outside end of each section of axle C. $f$ is a plurality of holes through the outside ends of axle C and as block L is attached to axle C by means of a bolt S, said block L can be attached to the axle through any of the holes $f$.

E is a pair of curved braces, one end of each brace being pivoted at each end of cross-bar B and extending backward to the outside ends of shaft C where it is fastened to block L by means of said bolt S. $r$ are a plurality of holes in the curved braces E for the purpose of shortening, or lengthening the distance between the axle C and the points on cross-bar B to which the braces are attached. The bolt S passes through block L, and one of the holes in axle C.

G are a plurality of disks carried on axle C. $G^1$ is a pair of disks of smaller diameter than disks G, one of which is attached on the inside end of each section of the axle. The concavity of disks $G^1$ is less than the other disks, the purpose of this construction being to prevent the ground from piling up in a ridge in the center between the rows, as disks with less concavity do not throw the ground as freely as those with the greater concavity. J are housings having flanges on each end. They are constructed to turn on axle C and are of such length that they space the disks a uniform distance apart. K are collars, one of which is attached to each section of axle C, on the inside end thereof, and forms a stop for the housings. H are a plurality of rings, or small sections of housings used to space the distance from one end of each section of the axle C to the concave side of the first disk from such end. It will be noted that if the disks are arranged to throw the earth toward the center of the row, the adjustment rings will be placed on the outside ends of the sections of the axle C, and if the disks are placed to throw the ground away from the center of the row, the rings will be placed on the inside ends of said sections. The lengths of these sections of housing correspond with the distance between the holes f at the outside ends of the sections of the axle C. It will be noted that when the sections of the axle are swung from a position where they are at an angle to each other to a position where the angle is greater, the inside pair of disks, one on each section of the axle, will be moved farther apart, and by removing one or more rings from the inside ends of the sections of the axle, the disks can be moved closer together, or smaller or larger disks substituted as may be required. As the vines grow older and increase in size the cut of the plow should be narrower.

Q is a shoe, one end of which is attached to the underside of brace E, and the other end to the under side of block L. The purpose of shoe Q is to keep the disks from cutting too deep, especially in turning the cultivator around. P are space blocks between the end of the shoe and the block L, its purpose being to adjust the distance from the shoe to the lower cutting edge of the disks.

M is a weight box balanced on pole A with the ends thereof resting on supporting braces V. m are a plurality of holes through the pole A by means of which the weight box M can be bolted to the pole. The box can be moved forward or backward and can be adjusted so the weight will be directly over the disks at any angle at which the sections of axle C are adjusted, and directly over them. $f^2$ are a plurality of holes through brace T by which it is attached to a bent portion $C^2$. $f^3$ are a plurality of holes through the portion of the axle $C^2$. The supporting braces V are attached to braces T, and the disk cleaners shown on the drawing as W are carried on said brace T. N is a vertically adjustable draw bar attached to the front end of main pole A which can be inverted to make the range of adjustability greater. This draw bar consists of a member bolted on the pole so a portion thereof extends vertically and at right angles to the pole, either up or down, such right angle extension having a plurality of holes through which a clevis can be attached. The object of this construction is to raise or lower the draft so when the sections of the axle carrying the disks are set at an angle to each other, by lowering the front end of the pole the outside disks will not cut as deep as those near the center of the row, this being desirable in cultivating vines, as sometimes the soil should not be stirred as deeply near the vines as in the middle of the space between the rows. As above noted, draw-bar N can be reversed so it extends upward instead of downward so the pole can be thrown upward and thus raise the disks so the outside disk will cut deeper than those in the center as shown in Fig. 4. It will be noted that braces E are swung below the pole and the draft is approximately on line with the braces.

Block L is formed with a projection l of the same size and shape as collar K. The section of housing $J^2$ is formed with a socket k in the outside end thereof just large enough to rotatingly inclose projection l, or collar K. When the disks are set to throw the ground toward the center of the row, the projection l is inclosed in socket k, forming a dust proof bearing, and when the disks are reversed the collar K rotatingly fits into socket k, forming a dirt or dust proof bearing.

It is to be noted that the cross-bar B can be dispensed with and the braces E can be attached directly to the pole A.

I claim as new and ask for Letters Patent upon:

1. In a vineyard disk plow, the combination of a main pole, a cross-bar attached to the pole, an axle in two sections, each of said sections being hinged to the pole so they will swing on a horizontal plane, disks fitted to rotate on said axle, braces from the outside ends of the sections of the axle to the cross-bar, and an adjustable weight box attached to the pole directly over the disks, substantially as described.

2. In a vineyard disk plow, the combination of a main pole, a cross-bar attached to the pole, an axle in two sections, each of said sections being hinged to the pole so they will swing independently and on a horizontal plane, disks fitted to rotate on the axle, braces from the pole to the approximate outside ends of each of said sections of the axle, and a shoe depending from said brace and spaced from the under side of each of the outside ends of the axle, substantially as described and for the purposes set forth.

3. In a vineyard disk cultivator, the combination of a main pole, a cross-bar attached to the pole, an axle in two sections each of said sections being hinged to the pole so they will swing independently and on a horizontal plane, braces from the outside end of each of the sections of the axle to the cross-bar, said braces having a plurality of holes therein to be adjustable for variable distances between the point on the cross-bar and the outside ends of the sections of the axles to which such braces are attached.

4. In a vineyard disk cultivator, the combination of a main pole, a cross-bar attached to the pole, an axle in two sections each of said sections being hinged to the pole so they will swing independently and on a horizontal plane, disks spaced on said axle and fitted to rotate thereon, a collar attached near the inside end of each of said sections of the axle, a plurality of rings surrounding the axle and filling up the space between said collar and the first nearest disk thereon, curved braces extending from the pole to the axle, and a plurality of holes through the axle adapted to bolt the braces thereto, said holes being the same distance apart as the width of the rings, substantially as described and for the purposes set forth.

5. In a vineyard disk plow, the combination of a pole, a cross-bar attached to the pole, an axle in two sections, each of said sections being hinged to the pole so they can swing independently and on a horizontal plane, disks fitted to rotate on the axle, two curved braces, one of which is attached at each end of the cross-bar and to the axle near the outside ends thereof, an extension upward from the inside end of each section of the axle, said extension having a portion bent at right angles and parallel to the axle, said bent portion having a plurality of holes therein, and a brace bolted through one of said holes to the horizontally bent portion and extending parallel with the axle to near the outside end thereof, and bent downward and attached to the axle, substantially as described.

6. In a vineyard disk plow, the combination of a pole, a cross-bar attached to the pole, an axle in two sections, each of said sections being hinged to the pole so they can swing independently and on a horizontal plane, disks fitted to rotate on the axle, braces extending from the cross bar to the approximate outside ends of the axle, an adjustable brace extending upward from each end of each section of the axle and portions thereof bent to run parallel with the said sections, and a horizontally elongated inverted U rest, attached to the top of said brace, and a weight box resting thereon, substantially as described.

7. In a vineyard disk plow, the combination of a pole, an axle in two sections, each section being hinged to the pole so they can swing independently of each other and on a horizontal plane, each of said sections having a portion bent upward at right angles with the main portion of the axle, and a portion thereof bent so it is parallel with the main part of the axle, a collar attached to each section of the axle near the inside end of the main portion thereof, a block support attached to the outside end of each section of the axle, and a plurality of holes at the outside end of said axle whereby the block may be attached to the axle at various distances from said outside end, disks rotatingly disposed on said main portion of the axle by being attached to sections of housing constructed to rotate thereon, sections of housing the same length as the distance between the holes at the outside ends of the sections of the axle used to space the distance between the collar and the first nearest disk thereto, and a brace extending from and attached to the said block and the outside end of the axle through one of the holes therein to the parallel portion of the axle, and a series of holes in said parallel portion of the axle the same distance apart as the holes in the outside ends of the sections of the axle through which said brace can be bolted to the axle, substantially as described and for the purposes set forth.

8. In a vineyard disk plow, the combination of a pole, an axle in two equal sections, each section being hinged to the pole so it can swing horizontally and independently of the other, a collar attached to each section of the axle near the inside end thereof, a block support attached near the outside end thereof, said block support having a projection on the inside and around the axle of the same approximate size and shape as the collar, disks rotatingly attached to the axle and spaced by means of sections of housing bolted to the disks so they will rotate on the axle, the outside ends of the outside sections of housing having sockets therein into which the collar and the projection can rotate, substantially as described.

9. In a vineyard disk plow, the combination of a pole, an axle in two equal sections, each of said sections being hinged to the pole so it can swing independently and on a horizontal plane, disks fitted to rotate and spaced on said axle, braces extending from the forward end of the pole to the outside end of the sections of the axle, and a block fitted to the end of said axle, said brace, axle and block being fastened together by a bolt passing through them, substantially as described.

JAMES PORTEOUS.

Witnesses:
H. A. HUEBNER,
R. G. HARRELL.